United States Patent [19]

Anderson

[11] Patent Number: 4,738,816
[45] Date of Patent: Apr. 19, 1988

[54] FLEXIBLE MANDREL
[75] Inventor: Rick A. Anderson, Sun Prairie, Wis.
[73] Assignee: The Goodyear Tire & Rubber Company, Akron, Ohio
[21] Appl. No.: 801,525
[22] Filed: Nov. 25, 1985
[51] Int. Cl.⁴ .................. B29C 33/36; B29C 33/46; B29C 33/74; B31C 1/08
[52] U.S. Cl. ..................... 264/313; 264/335; 264/337; 156/149; 156/428
[58] Field of Search ............ 72/466; 29/234; 57/216, 57/220, 217, 230, 232, 238, 241; 156/143, 173, 149, 428; 264/209.6, 313, 335, 337, 174, 166; 425/437, 438, 466, 467, 275

[56] References Cited
U.S. PATENT DOCUMENTS

| | | |
|---|---|---|
| 400,970 | 4/1889 | Thompson .......................... 57/216 |
| 2,322,773 | 6/1943 | Peters ................................. 57/232 |
| 2,974,713 | 3/1961 | Hydrick, Jr. ..................... 156/149 |
| 3,048,078 | 8/1962 | Kaplan .............................. 57/232 |
| 3,414,448 | 12/1968 | Harpfer ........................... 156/149 |
| 3,972,757 | 8/1976 | Derderian ........................ 156/143 |
| 4,059,951 | 11/1977 | Roe .................................. 57/230 |
| 4,103,410 | 8/1978 | Pennell ............................ 425/467 |
| 4,176,705 | 12/1979 | Russell et al. ................... 57/220 |
| 4,242,296 | 12/1980 | Bricker ............................ 156/173 |

Primary Examiner—Lowell A. Larson
Attorney, Agent, or Firm—M. R. Dion, Sr.

[57] ABSTRACT

There is disclosed a flexible mandrel for making tubular products comprising an elastomeric portion surrounding a reinforcing cable comprised of wire cables twisted around a non-metallic core. There is also disclosed a process for making a flexible mandrel and a process of making a hose using the flexible mandrel.

1 Claim, 1 Drawing Sheet

FLEXIBLE MANDREL

FIELD

This invention relates to a flexible mandrel used for making indefinite lengths of tubular products. More particularly it relates to a reinforced flexible mandrel for making hoses.

BACKGROUND ART

Flexible mandrels have been in existence for many years. Initially they were solid cylindrical extrusions of rubber or plastic upon which the various layers of polymers and reinforcement were built to form tubular products. These suffered from lack of dimensional stability in both the radial and the longitudinal directions as well as the inability to repair or connect broken sections. The next modification was to introduce a reinforcing cable about which the rubber or plastic cylinder was extruded to form a mandrel. While this provided dimensional stability and repairability, the service life was shortened as a result of using water pressure to blow the flexible mandrel out of the tubular product. It is believed that the water entered the core of the cable reinforcement thereby attacking the wire and destroying the rubber or plastic to wire adhesion which in turn caused a loss of dimensional stability.

In order to overcome this wicking action of water entering through the core of a wire cable, the next modification was to use a non-metallic cable made of a somewhat compressible thermoplastic material, e.g., a polyamide. This solid or tightly stranded material when used as the core for the extruded rubber or plastic cylinder provided dimensional stability and prevented the wicking action of the water entering the core. However, the broken or cut lengths could not be repaired.

DESCRIPTION OF THE INVENTION

In accordance with the practice of the present invention, there is disclosed a flexible mandrel for making tubular products comprising an elastomeric portion surrounding a reinforcing cable comprised of wire cables twisted around a non-metallic core. Such a flexible mandrel has been found to remain dimensionally stable in both the radial and the longitudinal directions. The flexible mandrel of the invention is repairable because of the presence of the wire cable wherein two cables may be crimped together in a manner similar to electrical cables and recovered with elastomer. The presence of non-metallic core, which fills the spaces internally of the wire cable, prevents the wicking action of the water pressure from attacking the wire cable thus extending the serviceable life of the flexible mandrel.

There is also disclosed a process for making a flexible mandrel comprising:

(a) twisting a wire cable around a non-metallic core and (b) applying an elastomeric portion to (a) in cylindrical form.

There is also disclosed a process for making hose comprised of building hose around the flexible mandrel of this invention.

DETAILED DESCRIPTION OF THE DRAWINGS

Figure 1:
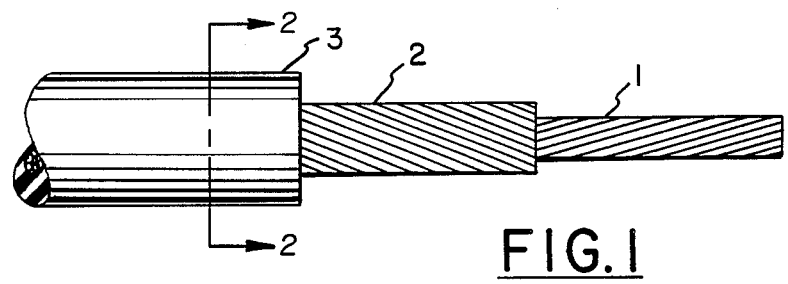
FIG. 1 is a side sectional view of the flexible mandrel of this invention.
Figure 2:
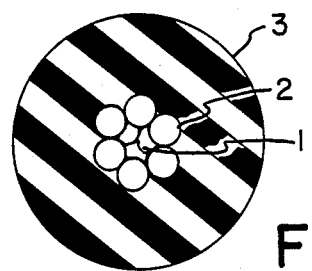
FIG. 2 is a cross-section of FIG. 1 taken along 2—2.

FIG. 1 and FIG. 2 illustrate the non-metallic core 1, which can be solid or stranded, about which has been twisted wire cables 2 to form the reinforcing member over which is extruded the elastomeric portion 3 to form the flexible mandrel of this invention.

Figure 3:
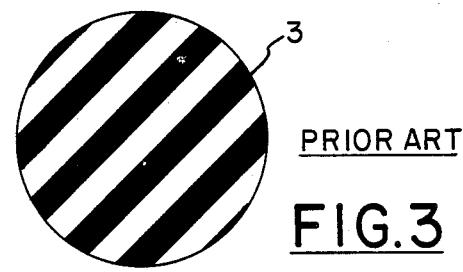
FIG. 3 represents a cross-sectional view of the prior art solid elastomeric mandrel.

FIG. 3 illustrates the prior art unreinforced flexible mandrel having only the elastomeric portion 3.

Figure 4:
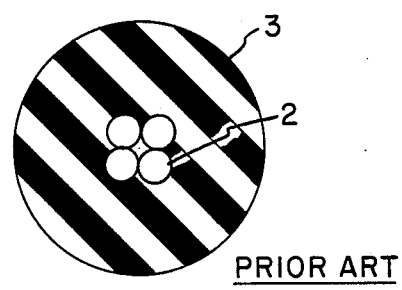
FIG. 4 is a cross-sectional view of a prior art wire cable reinforced mandrel.

FIG. 4 shows a prior art wire cable reinforcement 2 surrounded by an elastomeric portion 3. The incompressible strands or cables are so constructed or configured as to leave an open space between adjacent strands or cables.

Figure 5:
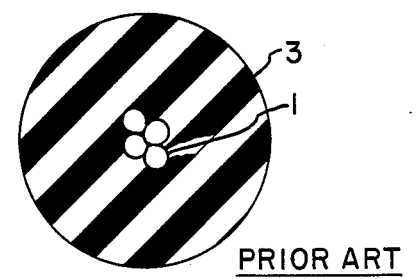
FIG. 5 is a cross-sectional view of a prior art non-metallic reinforced mandrel.

FIG. 5 shows a prior art mandrel with an elastomeric portion 3 reinforced with a non-metallic material 1 which is compressible enough to eliminate the spaces between adjacent strands.

DETAILED DESCRIPTION OF THE INVENTION

The flexible mandrel of this invention comprises a cylindrical elastomeric portion which is applied around a reinforcing cable which comprises wire cables twisted around a non-metallic core. The elastomeric portion can be any one of a number of compounded elastomers suitable for the purpose of making flexible mandrels. While the term elastomer generally connotes a thermosetting polymer, it is meant to include any polymer which exhibits flexibility in the temperature range of building and curing operations of the tubular products thereon and is capable of maintaining its shape.

The reinforcing cable can be made by twisting individual wire strands into individual cables which are then twisted themselves around the non-metallic core. The non-metallic core can be individual strands or filaments which are twisted together tightly in order to eliminate any spaces between the individual strands or it can be a solid core. The non-metallic core material must be somewhat compressible, i.e., it must be compressible enough to conform itself within the internal portion of the wire cable and to its own twistings, if stranded, so as to eliminate any void spaces. The non-metallic material must be such as to not be deformed or decomposed within the temperature range of the tubular product building and curing operations. The preferred non-metallic material is an aromatic polyamide.

The flexible mandrels of this invention can be made in any size within the limitations of being capable of fitting the reinforcing portion within the elastomeric portion while having the tensile strength required to withstand handling in a particular tubular product building process. Generally the size can range from 6 mm to about 40 mm, however, larger sizes would only be limited by the size of the equipment available to handle the mandrels and/or the tubular products made with the mandrels.

EXAMPLE

Three strands of 1500 denier aromatic polyamide fiber were twisted together to form a core for a reinforcement cable. The core was then wrapped with six steel wire cables in a twisted fashion having a lay of 15 mm in an S direction. Each steel wire cable contained six 0.2 mm strands having a lay around one 0.2 mm strand of about 4 mm in the Z direction. This reinforcement core was then passed through an extruder and covered with an EPDM rubber compound to form a flexible mandrel having an outside diameter of 8 mm. The flexible mandrel was cut into individual mandrels of about 200 m in length and used for making hoses wherein after the hose was built it was coiled on a drum and placed in an autoclave for curing. After curing and cooling, water pressure was applied to one end of the hose to blow out the mandrel.

Whereas the prior experience with flexible mandrels reinforced only with wire cable provided a serviceable life of 7 to 10 cycles, the flexible mandrels of the present invention have surpassed 30 to 40 cycles.

While certain representative embodiments and details have been shown for the purpose of illustrating the invention, it will be apparent to those skilled in the art that various changes and modifications may be made therein without departing from the spirit or scope of the invention.

What is claimed is:

1. A process for making a hose comprised of the steps of:
    (a) providing a flexible mandrel having an elastomeric portion surrounding a reinforcing cable comprised of wire cables twisted around a non-metallic core and
    (b) building the hose around the flexible mandrel of step (a).

* * * * *